H. M. CLEARWATER.
BLANK FOLDING MACHINE.
APPLICATION FILED OCT. 23, 1913.
1,172,343.
Patented Feb. 22, 1916.
7 SHEETS—SHEET 7.
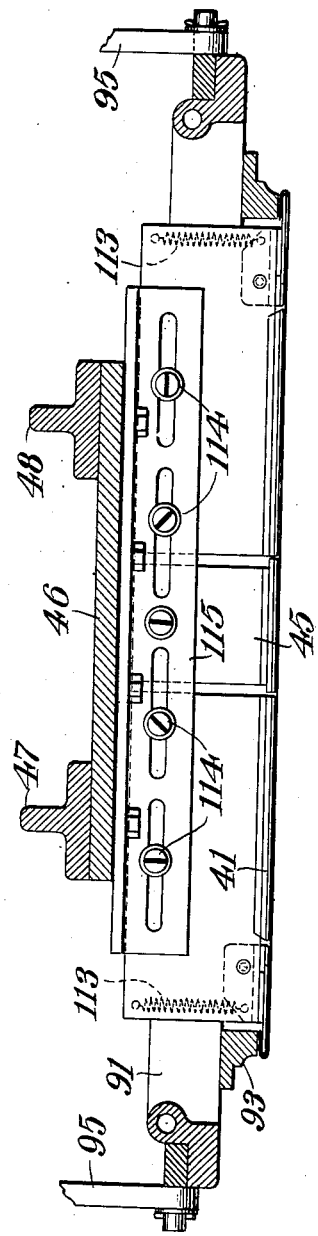
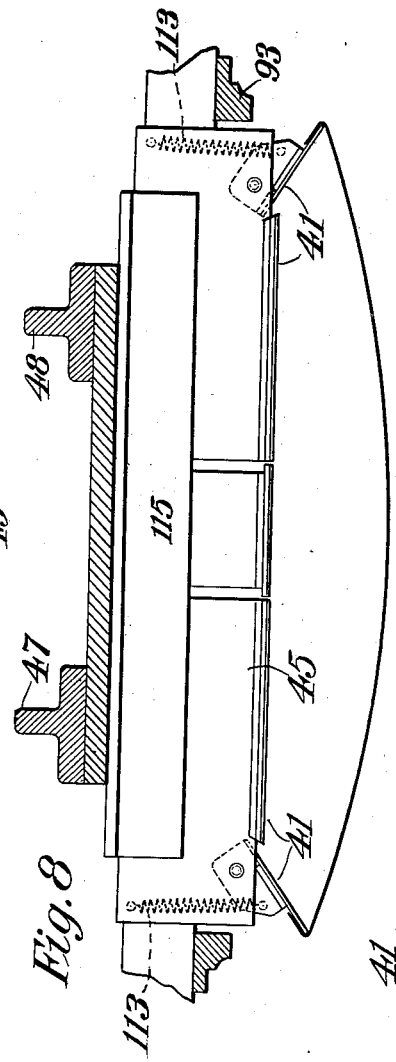
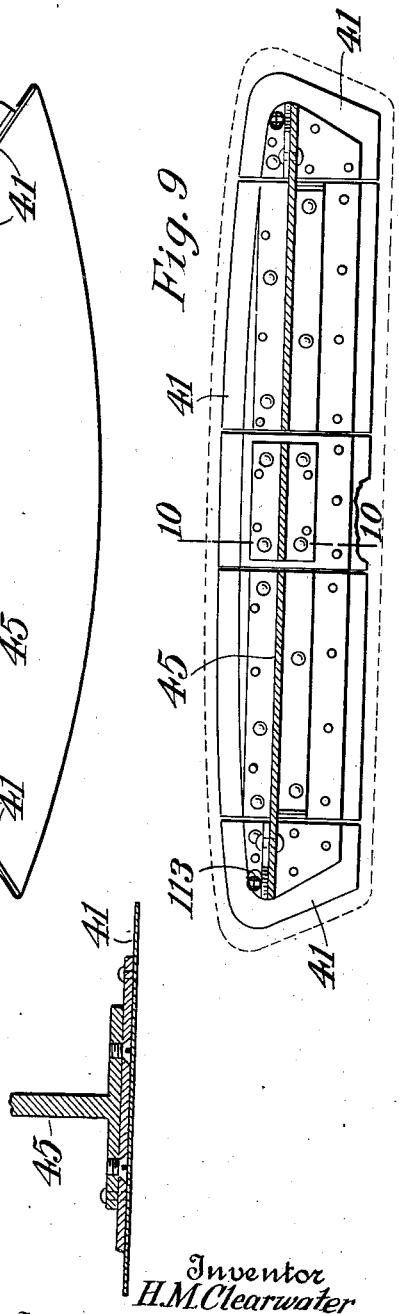
Witnesses:
Raphaël Netter
Thomas J. Byrne
Inventor
H. M. Clearwater
By his Attorneys
Kerr, Page, Cooper & Hayward

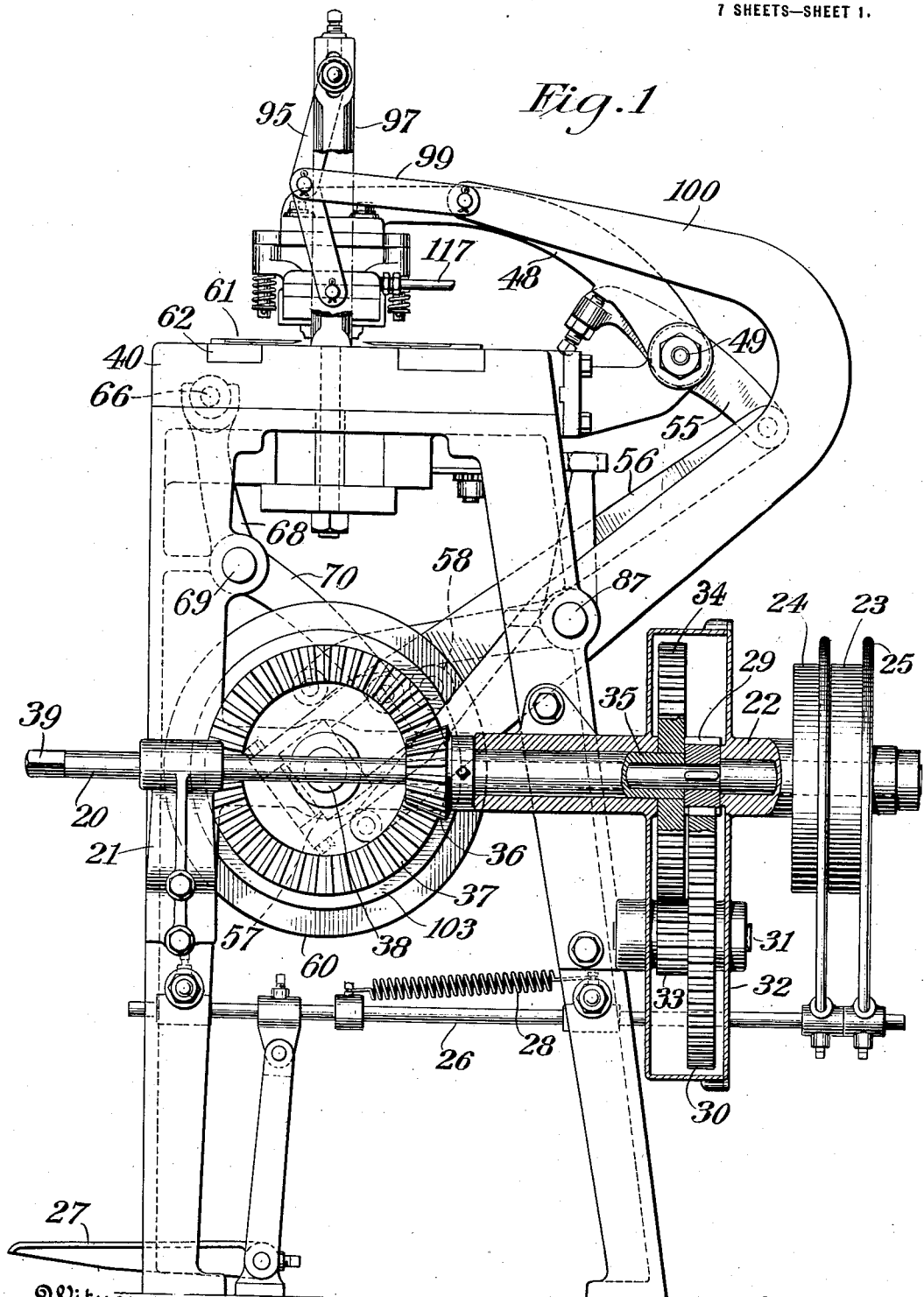

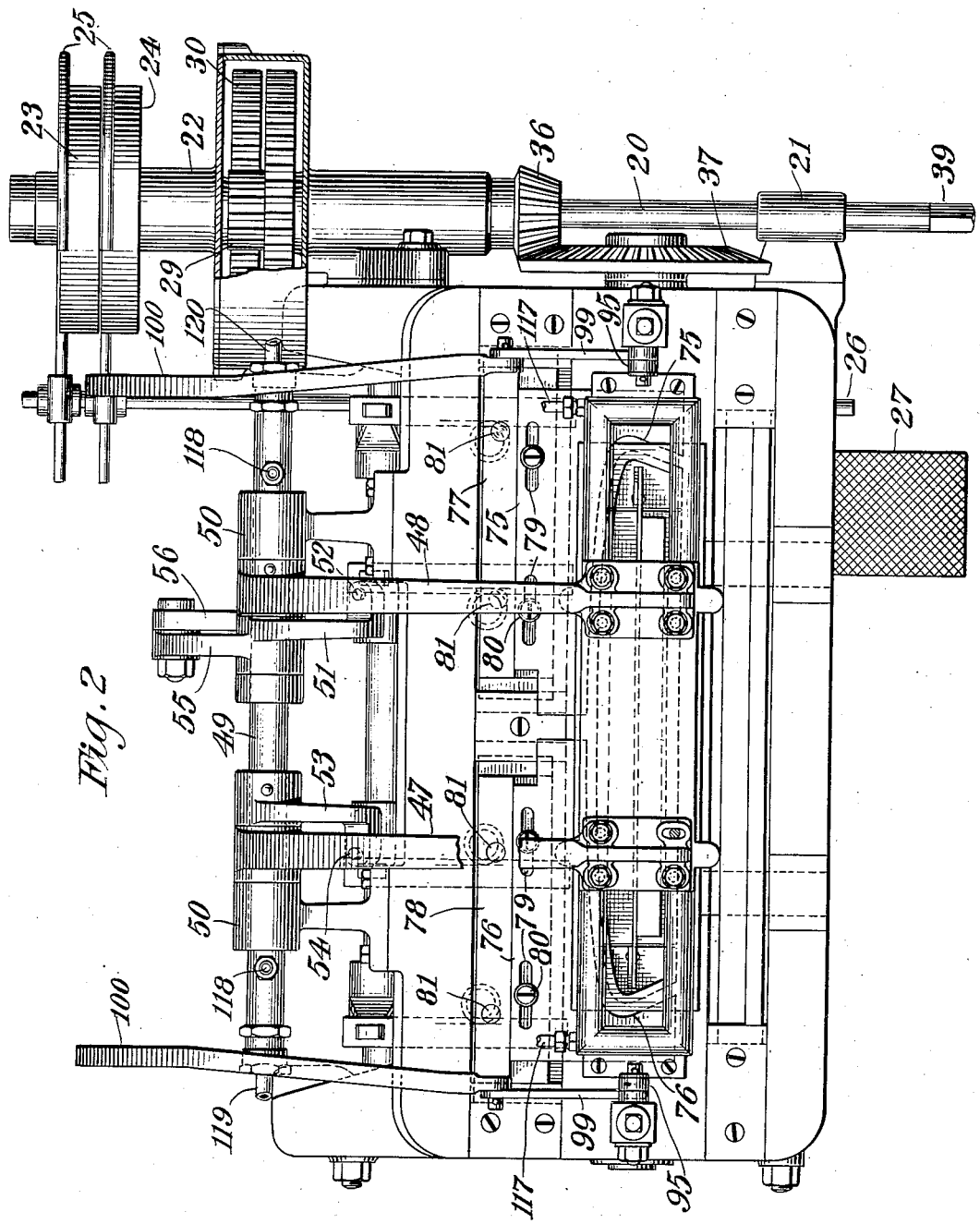

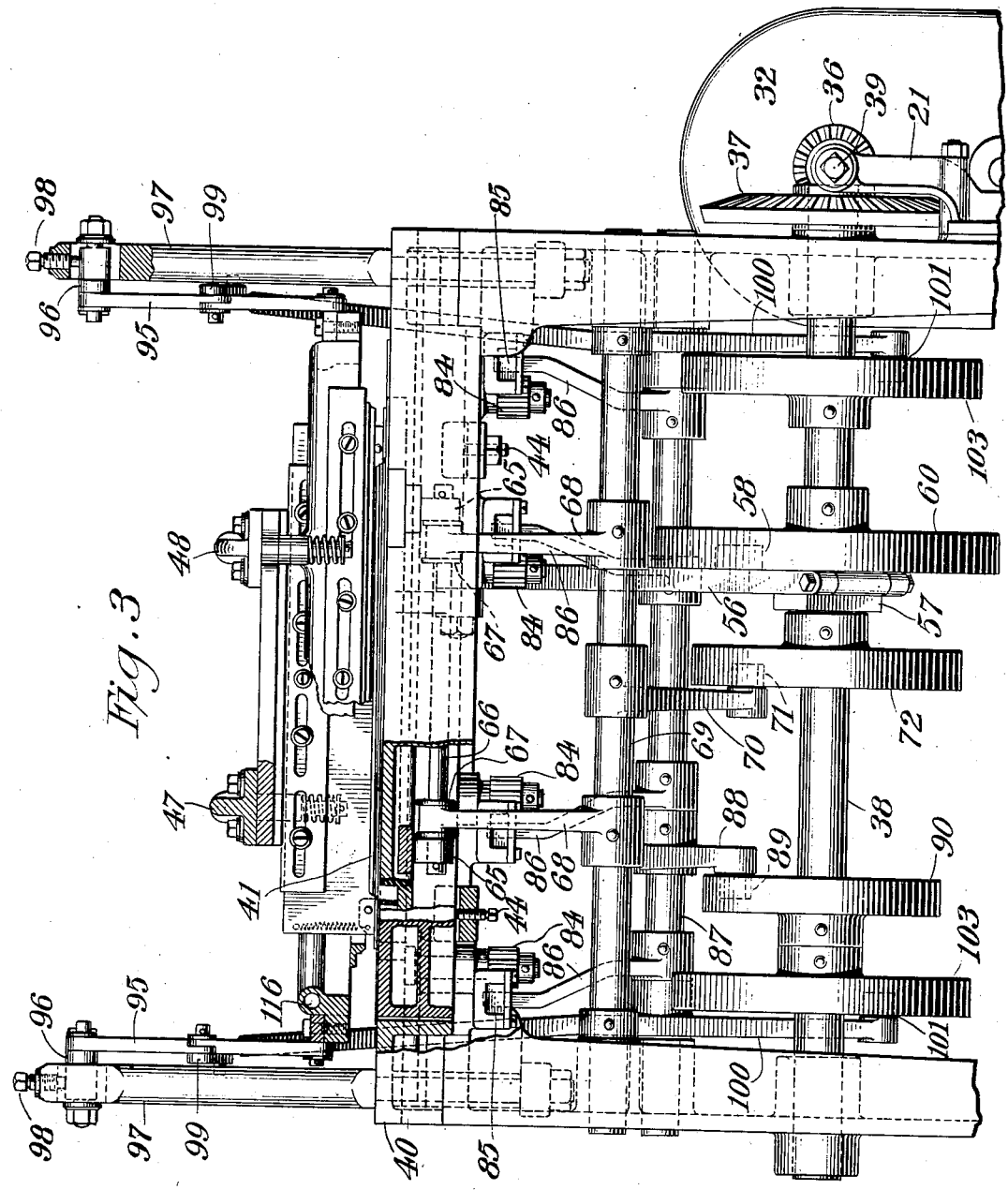

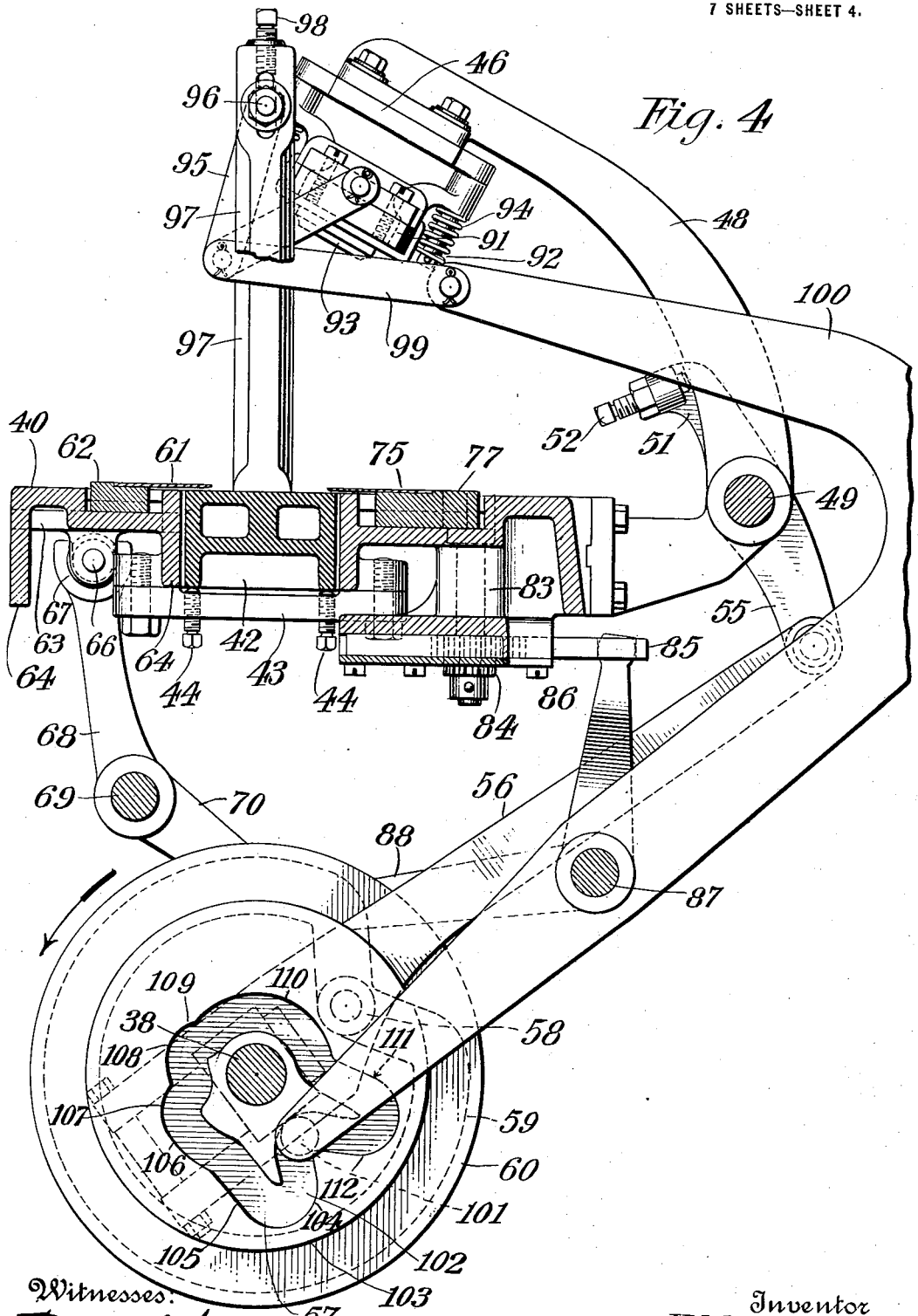

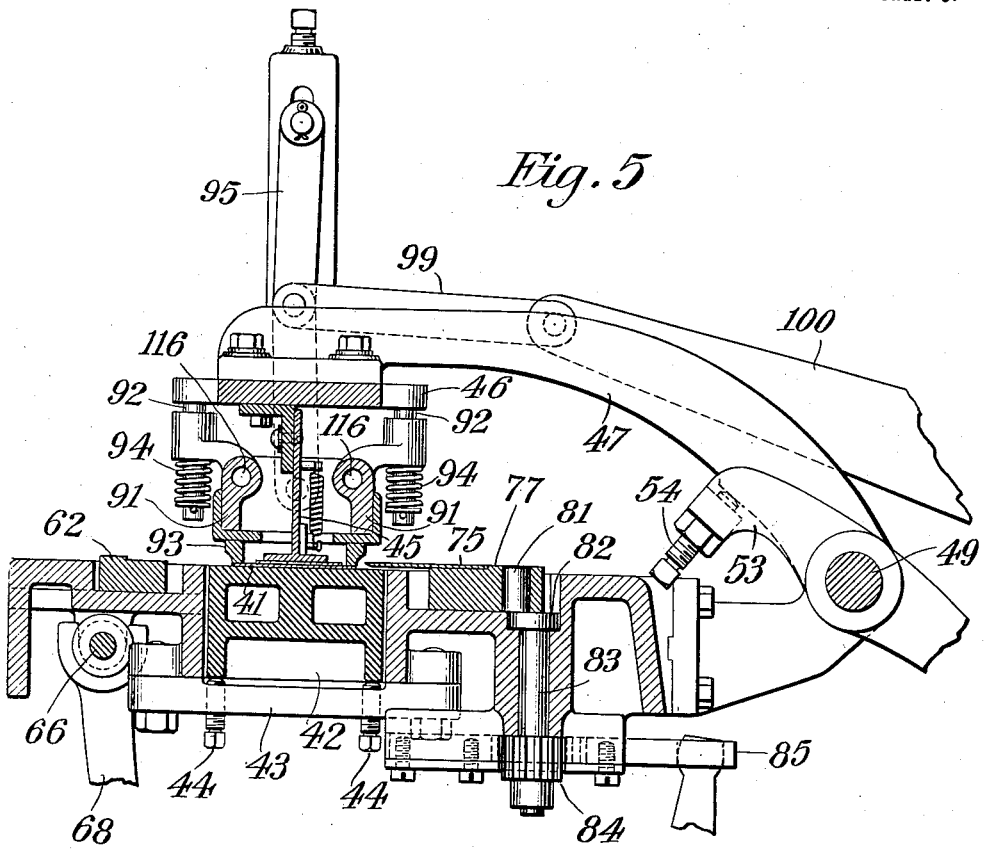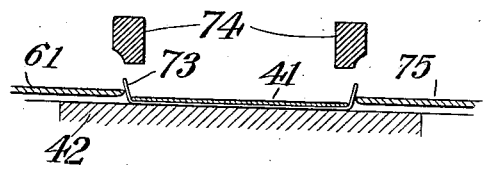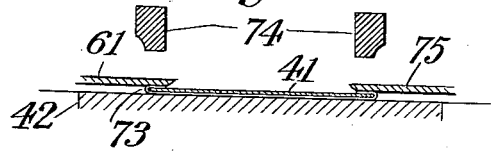

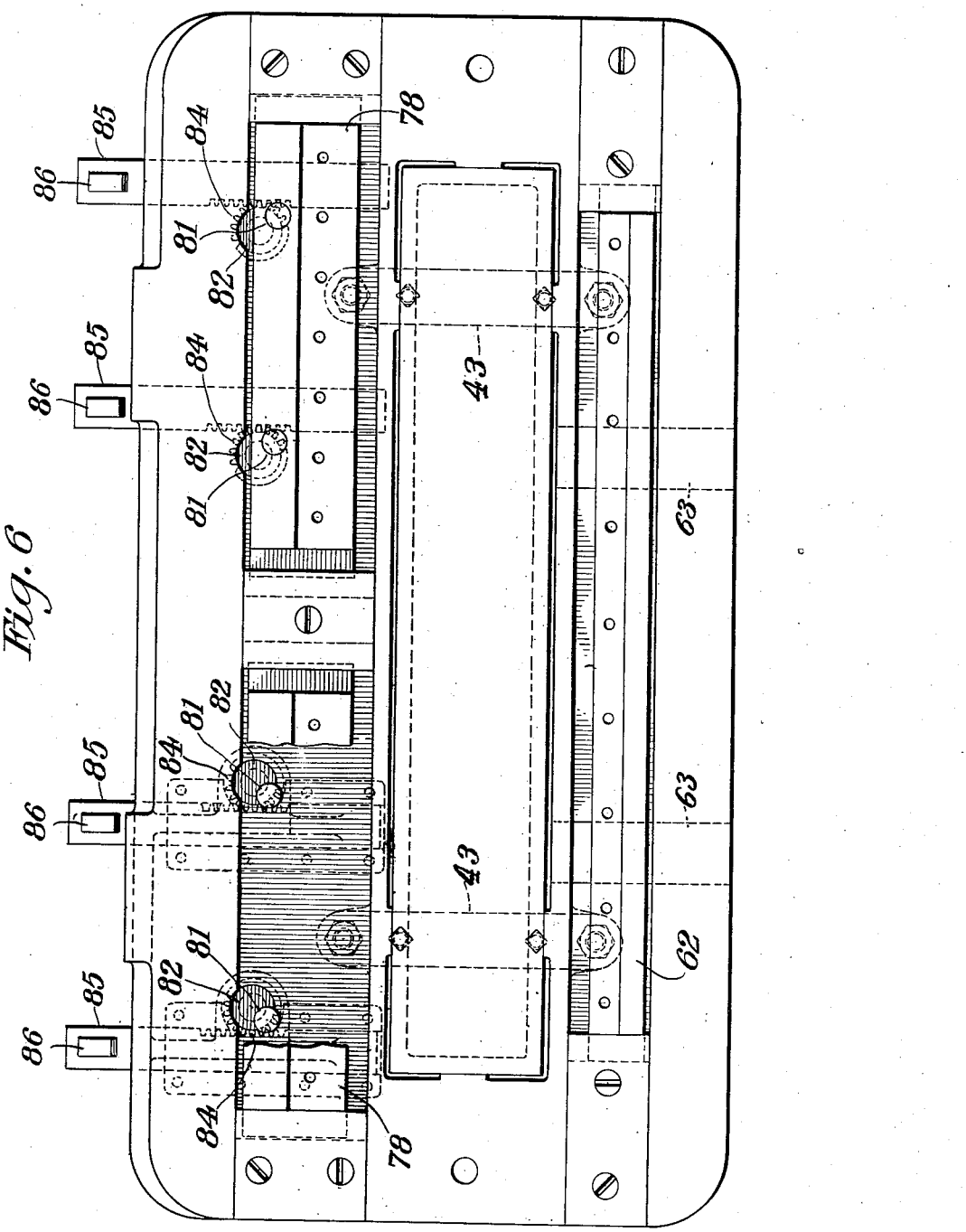

UNITED STATES PATENT OFFICE.

HARLEY M. CLEARWATER, OF TROY, NEW YORK, ASSIGNOR, BY MESNE ASSIGNMENTS, TO REECE FOLDING MACHINE COMPANY, OF BOSTON, MASSACHUSETTS, A CORPORATION OF MAINE.

BLANK-FOLDING MACHINE.

1,172,343.  Specification of Letters Patent.  Patented Feb. 22, 1916.

Application filed October 23, 1913. Serial No. 796,772.

*To all whom it may concern:*

Be it known that I, HARLEY M. CLEARWATER, a citizen of the United States, residing at Troy, in the county of Rensselaer and State of New York, have invented certain new and useful Improvements in Blank-Folding Machines, of which the following is a full, clear, and exact description.

This invention relates to machines for folding the edges of blanks for collars, cuffs, and the like, and its chief object is to provide for the purpose a power-driven machine of the utmost simplicity in construction and operation.

A further object is to provide a machine in which the fold-defining die or templet remains in the folds of the blank during and after the pressing thereof, so as to carry the folded and pressed blank away from the bed on which the folding and pressing are effected; the die or templet being then capable of buckling, as distinguished from a collapsing movement in the plane of the die, to facilitate disengagement of the folded and pressed blank therefrom.

Another object is to provide a machine having a toggle-actuated presser, carried by the head or other part that carries the die or templet, which is at no time disconnected from the power-applying instrumentalities of the machine, thus avoiding the use of special devices or mechanism for locking the presser in operative position on the folded blank.

To these and other ends the invention consists in the novel features of construction, arrangements or parts and combinations of elements hereinafter described.

The invention can be embodied in a variety of forms, but for the sake of brevity I have specifically described herein only the embodiment which at the present time I consider most efficient and convenient. This embodiment is illustrated in the accompanying drawings, in which—

Figure 1 shows the complete machine in side elevation. Fig. 2 is a plan view of the same. Fig. 3 is a front view, with a portion of the table broken away to show a part of the folding mechanism. Fig. 4 is a side view, on an enlarged scale, of the folding and pressing mechanisms, the table and bed of the machine being in vertical section. Fig. 5 is a detail sectional view of the pressing mechanism showing the presser seated on the die or templet. Figs. 5$^a$, 5$^b$ and 5$^c$ are diagrammatic sectional views showing three stages of the folding and pressing operations. Fig. 6 is a plan view of the table and bed, showing the folder-stocks and part of their actuating mechanism. Fig. 7 is a front view of the die or templet, with the presser shown in cross section and seated on a folded blank. Fig. 8 is a similar view but omitting the presser and showing the die or templet buckled for the removal of the folded and pressed blank. Fig. 9 is a sectional plan view of the die or templet seated on an unfolded blank which is shown in dotted lines. Fig. 10 is central section of the die or templet, about on line 10—10 of Fig. 9.

The power shaft 20, mounted in a front bracket 21 and a rear sleeve-bearing 22, is provided at its rear end with a loose pulley 23 and a fast pulley 24, to which latter the driving belt (not shown) can be shifted at will by a shifter 25 mounted on the rear end of a sliding rod 26 which can be advanced by the pressure of the foot on a pedal 27. A coil spring 28 retracts the rod 26 so as to shift the belt from the fast to the loose pulley and raise the pedal when the pressure on the latter is relieved. On the driving shaft is a pinion 29 meshing with a gear 30 on a short countershaft 31 journaled in the gear casing 32 and carrying a pinion 33 rigidly connected to the gear. The last named pinion meshes with a gear 34 fixed on the rear end of a rotary sleeve 35 encircling the shaft 20 inside the sleeve-bearing 22. At the forward end the sleeve 35 has fixed to it a bevel pinion 36 driving a bevel gear 37 fixed on the right hand end of the transverse cam shaft 38. By means of the gear train described the high speed of the driving shaft is reduced to a suitably low speed at the cam shaft. At the front of the machine the shaft 20 is provided with a squared end 39 to receive a crank (not shown) when it is desired to rotate the shaft manually, as in adjusting, oiling, etc.

During the folding and pressing operations the blanks are supported by the bed or table 40, and are held in place thereon by a die or templet 41. The latter has the same size and contour as the finished "band" or "top" or cuff, and serves to define the folds made by the infolders as hereafter described. For the sake of convenient repair in case of breakage or other damage the portion of the bed which supports the blank and the pressure of the templet and presser is made separate from the rest of the bed, as indicated at 42, and held in position by two supports 43 bolted to the underside of the main portion of the table. By means of leveling screws 44 the top of the bed 42 is easily brought into the proper position flush with the top of the table 40.

The die or templet 41, mentioned above, is of the "solid" or non-collapsible type for the sake of simplicity and durability, and is suspended by a transverse web 45 (Fig. 5) on the underside of a head 46 which is itself mounted on the forward ends of two arms 47, 48, (Figs. 2, 3 and 5) mounted on a rock shaft 49 supported by brackets 50 projecting rearwardly from the table 40. The arms 47, 48 are swung about the axis of the shaft by the following mechanism. The arm 48 is fixed on the shaft, and alongside of the arm is a short arm 51 having at its forward end a lateral finger extending under the arm 48 and carrying a screw 52 bearing on the underside of said arm 48. The arm 47 is loose on the shaft, but alongside of it is another short arm, 53, fixed to the shaft and having at its forward end a lateral finger provided with a screw 54 bearing on the underside of arm 47. It will therefore be seen that if arm 51 is rocked the arm 48 and shaft 49 will be rocked, the latter rocking arm 53 which in turn swings arm 47 in unison with arm 48.

The arm 51 is itself rocked by a rearwardly extending arm 55 integral with the first, the two forming a lever fulcrumed on the shaft 49. The arm 55 is pivoted to a link 56 (Fig. 1) extending downwardly and forwardly and terminating in a forked end which slidably embraces a rectangular guide block 57 (Fig. 3) loose on the cam shaft 38. On the side of the link is a roller stud 58 extending laterally into a cam-groove 59 (Fig. 4) in the side of a cam 60 fixed on the cam shaft 38. It will therefore be seen that as the cam revolves the link 56 is reciprocated, thereby rocking the arms 47, 48 about the axis of shaft 49 and alternately raising and lowering the head 46 which carried the die or templet 41.

The forward infolder blade 61 (Figs. 1 and 4) extends transversely of the machine and is carried by a stock 62 movable backwardly and forwardly in a depression in the top of the table 40, the stock being guided in its movement by guide bars 63 (Figs. 4 and 6) fixed to the stock and working in suitable apertures in the depending webs 64 of the table. Depending from the said guide bars are two lugs 65 (Figs. 3 and 4) in which is mounted a transverse rod 66 bearing grooved collars 67 engaged by the forked upper ends of two arms 68. The latter are pinned to a transverse rock shaft 69 which also has pinned to it a rearwardly extending actuating arm 70 carrying a roller stud 71 projecting laterally into coöperation with a face cam 72 fixed on the same shaft 38. The rotation of the cam 72 therefore moves the front folder backwardly to fold the front edge of the blank, and then forwardly to permit the presser (hereinafter described) to be seated. This operation is illustrated in Fig. 5$^a$, in which the backwardly moving folder 61 is shown in the act of folding the edge of the blank 72 over the front edge of the die or templet 41, with the presser 74 above and ready to be seated on the fold after the withdrawal. In Fig. 5$^b$ the front edge of the blank is shown completely folded, and in Fig. 5$^c$ the folder 61 is withdrawn and the presser seated on the fold to crease the same. Figs. 5$^a$, 5$^b$ and 5$^c$ also show corresponding positions of one of the rear folders, 75.

The rear folding blades 75, 76, (Fig. 2) are substantially L-shaped so as to embrace the rear and end edges of the blank, and are mounted on stocks 77, 78, the blades being adjustable endwise on the stocks (by reason of the slots 79 through which extend the fastening screws 80) to provide for folding blanks of different lengths. The stocks are arranged in recesses in the top of the table, which recesses are of such a size as to permit movement of the stocks in paths which are slightly curved but are in general diagonal to the blank. To produce such movement of the stocks (and hence the folding blades also) they are connected to crank-pins 81 (Figs. 2 and 6) carried by crank disks 82 mounted in the bottoms of the recesses in which the stocks are arranged. These disks are fixed to the upper ends of vertical shafts 83 (Fig. 5) which at their lower ends carry actuating pinions 84 meshing with forwardly and rearwardly reciprocatory racks 85. It will therefore be seen that when the racks are reciprocated the folders 75, 76 are given a movement toward and from the blank in diagonal lines. The racks at their rear ends are connected to the upper ends of four actuating arms 86 fixed at their lower ends on a transverse rock shaft 87 which also has an arm 88 provided with a roller stud 89 projecting laterally into coöperation with an actuating cam 90 on the cam shaft 38; so that as the cam rotates, the shaft 87 will be rocked and the sliding racks 85 will be reciprocated.

The presser 91 is carried by the head 46 and encircles the web 45 of the die 41. The presser is movable relatively to the head, being for that purpose mounted to slide on guide rods 92 depending from the head.

The bottom of the presser is in the form of a depending rib or flange 93 of same contour and substantially the same size as (in no case smaller than) the folder blank which is to be pressed. Coil springs 94, encircling the guide rods 92, hold the presser normally in upper position, with the rib 93 above and out of contact with the templet so that the folders 61, 75, 76 can fold the blank-edges over the edges of the templet. To depress the presser and seat it with creasing pressure on the folder blank-edges the following mechanism is provided.

At the ends of the presser are two toggles 95 (Figs. 3, 4 and 5) having their lower links pivotally connected at their lower ends to the adjacent ends of the presser. At the upper ends the toggles are loosely connected to pivots 96 which are vertically adjustable in a pair of standards 97 by means of adjusting screws 98. It is clear that if the toggle links are not in alinement but are slightly buckled, the toggles will permit the head 46, with the die 41 and presser 91, to be moved toward and from the bed by the arms 47, 48. In Fig. 4 the head and parts carried thereby are shown raised with the togges fully buckled, and in Fig. 5 the head is shown fully lowered, with the toggle only slightly buckled.

At the joints between the links of the toggles the latter are pivoted to links 99 which at their rear ends are pivoted to the forward ends of two angular levers 100. As illustrated in Fig. 4, these levers are fulcrumed on the shaft 87 and at their lower ends carry roller studs 101 projecting into cam grooves 102 in cams 103 fixed on the cam shaft 38. From Fig. 4 it will be seen that the effect of the cam grooves 102 is, in general, to rock the levers 100. The timing of the various cams is, briefly, as follows: The cams 60 and 103 being in the positions shown in Fig. 4 and rotating in the direction of the arrow, the first effect of cam 60 is to swing the arms 47, 48 down, thereby depressing the head 46 and bringing the die 41 into operative position for the folding operation. It will be seen, however, that as the head descends, the toggle must swing forwardly on the upper pivot 96, which means that the link 99 must advance. This is provided for by the rise 104, which swings the lever 100 counterclockwise as seen in Fig. 4. Shortly after the lower link of the toggle passes its horizontal position in the descent of the head, further downward movement of the head is impossible unless the link 99 is retracted. Hence the drop 105 is provided to swing the lever 100 clockwise and retract the link 99 in harmony with the continued descent of the head and the concurrent straightening of the toggle. The head now reaches its lowermost position and the die or templet is seated on the blank as the dwell 106 reaches the stud 101. While this dwell is passing the cams 72, 90 move the folders 61, 75, 76 inwardly, thereby folding the edges of the blank over the templet-edges and then begin to withdraw the folders. As the latter begin their outward movement the drop 107 begins to straighten the toggle, so that as the folders move out the presser 91 moves down so as to take a position just above the folded blank-edges and thereby prevent the latter from opening up. A slight dwell 108 keeps the presser in this position until the folders escape the folds, then the drop 109 brings the presser down upon the folds with a creasing pressure, which pressure is continued by the long dwell 110 holding the presser seated. Finally the rise 111 buckles the toggle and lifts the presser, then the cam 60 raises the head; during which latter movement the rise 111 and drop 112 move the lever 100 and link 99 in harmony with the motions of the head and the toggle. This brings the parts back to the positions shown in Fig. 4 and completes the cycle.

The folds being pressed upon the edges of the die, it is evident that as the die ascends, after the pressing, it carries the folded and creased blank with it. This is an important advantage, as it dispenses with "picking mechanism" or "pickers" to lift the folded blank off the bed. When the head has risen far enough the operator can easily strip the blank off the die and lay it aside, either before or after he has arranged another blank on the bed for folding. To facilitate stripping the folded blank off the die the end portions of the latter are hinged to the central portion. Then the operator can take hold of the ends of the blank and by merely pulling down the said hinged ends of the die, as in Fig. 8, the blank readily comes off. In fact if the die-ends are swung down as shown the blank will either fall off or will come off with a touch of the hand. Coil springs 113 are provided to restore the hinged ends of the die to normal position with respect to the rest of the die.

To accommodate blanks of different lengths the die 41 and the web 45 are divided into three parts, as shown in Fig. 7. The central part is non-adjustably fixed to the head 46 but the end parts have their fastening screws 114 extending through slots in the depending head-flange 115 so that the said end parts can be moved out to increase the length of the die.

For the best results the presser 91 should be heated, and it is accordingly provided with steam passages 116, connected to pipes 117 (Fig. 2) to ports 118 in the hollow ends of the rock-shaft 49, to which steam is supplied through a pipe 119 suitably connected to the shaft. The steam entering by this pipe flows through pipe 117 at the left, passages 116, and pipe 117 at the right to the right-hand port 118, then out through a pipe 120 connected to that end of the shaft.

As previously stated, the invention is not limited to the specific form herein described, but can be embodied in other forms without departure from its proper spirit and scope.

What I claim is:—

1. In a folding machine, the combination of a support for the blank to be folded, a head having an extensive up and down movement above the support, an arm carrying the head and adapted to swing extensively upwardly and downwardly about a rear axis whereby to carry the head toward and from the support in an arc-shaped path, a die carried by the head, a presser carried by the head and moving up and down with the head and die and said presser also movable slightly relatively to the head toward and from the support when the head is in its lowermost position, and pressure-applying mechanism having connections constantly connected with the presser to seat and hold the same upon a folded blank and to permit upward movement of the head, the die, and the presser, after the pressing of the blank is completed.

2. In a folding machine, the combination of a support for the blank to be folded, standards at opposite sides of the support, a head movable toward and from the support between the standards, a die carried by the head, a presser carried by the head and movable relatively thereto whereby to be seated on the blank when the head is in its lowermost position, toggles connected to the standards, and the presser to actuate the latter, and power-applying mechanism constantly connected with the toggles to straighten and buckle the same.

3. In a folding machine, the combination of a support for the blank to be folded, standards at opposite sides of the support, an arm extending rearwardly from between the standards and adapted to swing toward and from the support about a rear axis, a head fixed to the arm between the standards, a die carried by the head, a presser carried by the head and movable independently thereof toward and from the support when the head is in its lowermost position, toggles connected at their upper ends to the standards and at their lower ends to the presser, power-driven mechanism to swing said arm, and means constantly connected with the toggles and said power-driven mechanism to straighten the toggles when the head is in its lowermost position and to buckle and straighten the toggle in harmony with the up and down movement of the head.

4. In a folding machine, the combination of a support for the blank to be folded, an arm mounted to swing upwardly and downwardly above the support on an axis at the rear of the support, a head mounted on the forward end of the arm and carried thereby, a die or templet carried by the head, a presser carried by the head and movable relatively thereto when the die is seated on a blank on the support, toggles connected with the presser to actuate the same and permit movement thereof in company with the head, levers connected with the toggles to straighten and buckle the same, a cam connected with the aforesaid arm to swing the same, cams connected with the aforesaid lever to actuate the same in harmony with the movements of the head, and power driven mechanism to actuate all said cams.

5. In a folding machine, the combination of a support for the blank to be folded, an arm above the support and mounted to swing up and down on an axis in the rear of the support, a head carried by the forward end of the arm, a die carried by the head, a presser carried by the head and movable relatively to the die toward and from the blank-support, a cam shaft, a cam thereon, a reciprocatory link connected with the arm and coöperating with the cam to swing said arm, toggles connected with the presser to move the same relatively to the die and permit movement of the toggles in harmony with the movements of the head, levers connected with the toggles to straighten and buckle the same, cams mounted on the said cam shaft and connected with the said levers to actuate the same, and means to rotate the cam shaft.

6. In a folding machine, the combination of a support for the blank to be folded, a die movable toward and from the support and adapted to be seated on a blank on the support to define the folds of the blank, folders movable inwardly and outwardly to fold edges of the blank over edges of the die, a presser movable with the die toward and from the support and also movable toward and from the support independently of the die when the latter is seated on a blank, toggles connected with the presser to actuate the same, a cam shaft, cams mounted on the cam shaft and connected with the folders to actuate the same, a cam mounted on the cam shaft and connected with the die and presser to raise and lower the same in unison, cams mounted on the cam shaft and connected with the toggles to actuate the same, and power-driven means to rotate the cam shaft.

7. In a folding machine, the combination of a horizontal bed, a shaft in rear thereof, a supporting arm extending forwardly over the bed and adapted to swing up and down about the axis of said shaft, a head carried by the arm at its forward end. a die carried by the head, a pressure carried by the head and movable relatively to the die, a pair of standards at the sides of the bed and between which the head moves, toggles connected to the standards and to the presser to actuate the latter, levers connected with the toggles to straighten and buckle the same, a cam shaft below the bed, a cam mounted on the cam shaft and connected with the said arm to swing the same, cams mounted on the cam shaft and connected with the levers to rock the same in harmony with the movements of the said arm, and means to rotate the cam shaft.

8. In a folding machine, the combination of a bed, a pair of standards one at each side of the bed, a head movable between the standards toward and from the bed, a die carried by the head, a presser carried by the head and movable relatively to the die, toggles connecting the ends of the presser to the upper ends of the said standards, levers fulcrumed below the bed and having their upper ends adjacent to the toggles, links connecting the upper ends of the levers to the toggles to actuate the latter, means to rock the levers, means to raise and lower the head, and mechanism to actuate both said means.

In testimony whereof I affix my signature in the presence of two subscribing witnesses.

HARLEY M. CLEARWATER.

Witnesses:
   FRANK J. WEHREN,
   GEO. P. STEWART.